(12) United States Patent
Petri

(10) Patent No.: US 8,709,238 B2
(45) Date of Patent: Apr. 29, 2014

(54) PROCESS FOR SEPARATING CRUDE TALL OIL FOR PROCESSING INTO FUELS

(75) Inventor: John A. Petri, Wauconda, IL (US)

(73) Assignee: UOP LLC, Des Plaines, IL (US)

( * ) Notice: Subject to any disclaimer, the term of this patent is extended or adjusted under 35 U.S.C. 154(b) by 207 days.

(21) Appl. No.: 13/474,884

(22) Filed: May 18, 2012

(65) Prior Publication Data

US 2013/0306518 A1 Nov. 21, 2013

(51) Int. Cl.
*C10G 7/06* (2006.01)
*C10G 7/00* (2006.01)
*C10G 45/00* (2006.01)
*C10G 47/00* (2006.01)

(52) U.S. Cl.
USPC ........... 208/354; 208/347; 208/350; 208/108; 208/209; 203/71; 203/73; 203/79; 203/80; 203/81

(58) Field of Classification Search
CPC ............ C10G 7/00; C10G 7/06; C10G 45/00; C10G 47/00
USPC ......... 208/347, 350, 352, 356, 357, 361, 364, 208/366, 108, 209; 162/1, 16; 203/71, 73, 203/79, 80, 81, 83
See application file for complete search history.

(56) References Cited

U.S. PATENT DOCUMENTS

| | | |
|---|---|---|
| 3,216,909 A | 11/1965 | Bress |
| 3,257,438 A | 6/1966 | Wicke, Jr. et al. |
| 3,496,159 A | 2/1970 | Spence |
| 2003/0144536 A1 | 7/2003 | Sonnier et al. |
| 2011/0049012 A1 | 3/2011 | Stigsson et al. |

*Primary Examiner* — Walter D Griffin
*Assistant Examiner* — Derek Mueller
(74) *Attorney, Agent, or Firm* — Maryann Maas

(57) ABSTRACT

Crude tall oil is subjected to a distillation process that substantially removes impurities. The process produces a combined pitch and a distillate of free fatty acids and rosin acids from two vacuum columns. The distillate stream is amenable to further downstream hydroprocessing.

20 Claims, 1 Drawing Sheet

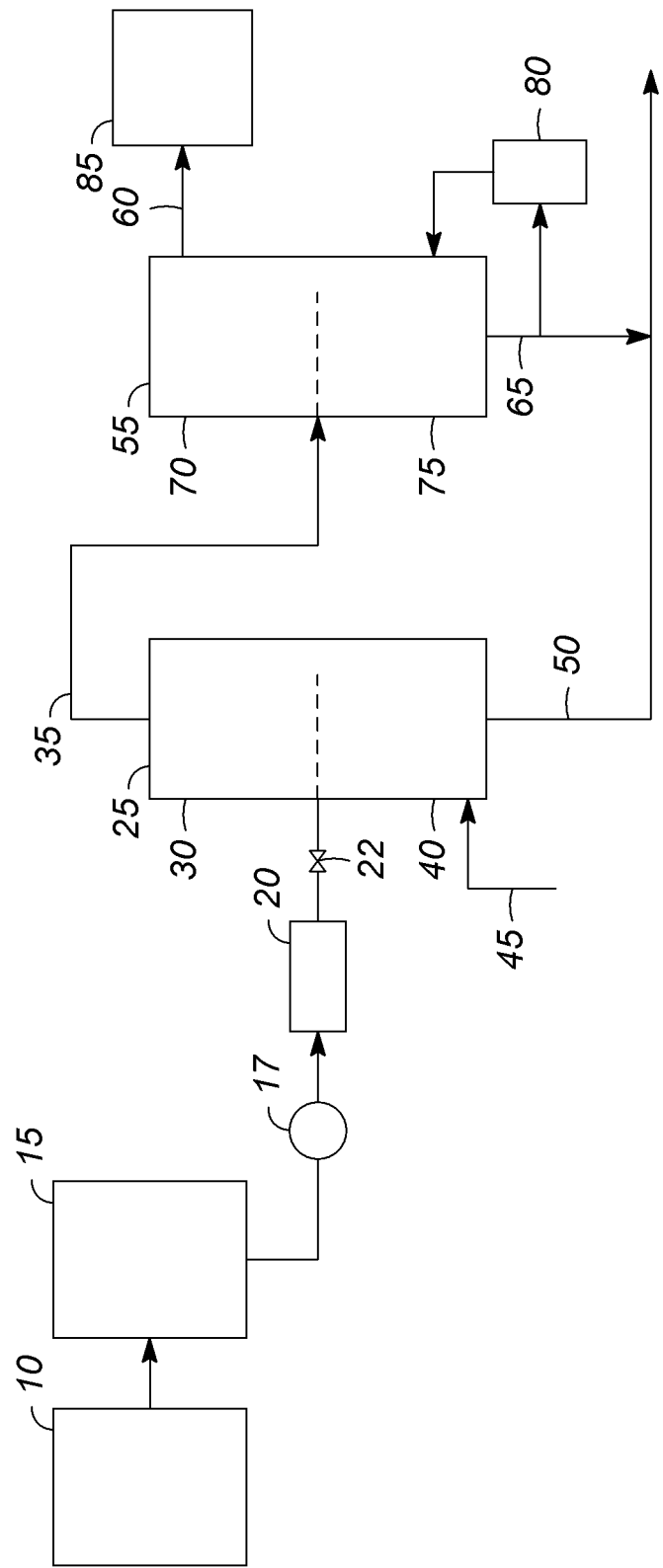

PROCESS FOR SEPARATING CRUDE TALL OIL FOR PROCESSING INTO FUELS

FIELD OF THE INVENTION

This invention relates generally to a process for removing impurities from crude tall oil before the tall oil is processed into biofuel.

BACKGROUND OF THE INVENTION

As the demand for fuels such as aviation and diesel fuels increase worldwide, there is increasing interest in sources other than petroleum crude oil for producing the fuel. One source is renewable feedstocks including, but not limited to, plant oils such as corn, jatropha, camelina, rapeseed, canola, soybean and algal oils, animal fats such as tallow, fish oils, and various waste streams such as yellow and brown greases. The common feature of these feedstocks is that they are composed of mono- di- and tri-glycerides, and free fatty acids (FAA). Another class of compounds appropriate for these processes is fatty acid alkyl esters (FAAE), such as fatty acid methyl ester (FAME) or fatty acid ethyl ester (FAEE). These types of compounds contain aliphatic carbon chains generally having from about 8 to about 24 carbon atoms. The aliphatic carbon chains in the glycerides, FFAs, or FAAEs can be saturated or mono-, di- or poly-unsaturated. Most of the glycerides in the renewable feed stocks will be triglycerides, but some may be monoglycerides or diglycerides. The monoglycerides and diglycerides can be processed along with the triglycerides.

There are reports disclosing the production of hydrocarbons from renewable feedstocks. For example, U.S. Pat. No. 4,300,009 discloses the use of crystalline aluminosilicate zeolites to convert plant oils (e.g., corn oil) to hydrocarbons (e.g., gasoline), and chemicals (e.g., para-xylene). U.S. Pat. No. 4,992,605 discloses the production of hydrocarbon products in the diesel boiling range by hydroprocessing vegetable oils such as canola or sunflower oil. Finally, US 2004/0230085 A1 discloses a process for treating a hydrocarbon component of biological origin by hydrodeoxygenation followed by isomerization.

SUMMARY OF THE INVENTION

One aspect of the invention is a method for separating crude tall oil to remove impurities. In one embodiment, the method includes introducing crude tall oil into the flash zone of a stripping column to separate the crude tall oil into a liquid and a vapor. The stripping column is under vacuum. The liquid is stripped in the stripping zone of the stripping column below the flash zone forming a heavy pitch bottoms stream and an overhead vapor stream. The overhead vapor stream from the stripping column comprises free fatty acids, rosin acids, heads, and light pitch. The overhead vapor stream from the stripping column is introduced into a second column between the stripping zone and the rectification zone to separate the overhead vapor stream into a light pitch bottoms stream and a distillate stream. The distillate stream contains free fatty acids, rosin acids, and heads.

BRIEF DESCRIPTION OF THE DRAWING

The FIGURE is a schematic of one embodiment of a tall oil separation process according to the present invention.

DETAILED DESCRIPTION OF THE INVENTION

The present invention relates generally to a process for producing a hydrocarbon product stream having hydrocarbons with boiling points substantially in the diesel and aviation fuel range from renewable feedstocks originating from plants or animals other than petroleum feedstocks. A process has been developed which removes impurities from tall oil so that it can be readily processed in the biofuel manufacturing process.

Such biofuel manufacturing processes typically include processing renewable feedstocks in one or more hydroprocessing reaction zones. The hydroprocessing reaction zone is a reaction environment that typically performs one or more of reactions such as isomerization, olefin saturation, aromatic saturation, deoxygenation, decarboxylation, decarbonylation, hydrodesulfurization, hydrodenitrification and hydrocracking. A hydroprocessing reaction zone is operated at elevated temperatures under a hydrogen rich atmosphere at elevated pressures. The distillate produced by the invention is processed in the hydroprocessing reaction zone primarily to perform deoxygenation and olefin saturation. In another embodiment, the distillate produced by the invention may also undergo isomerization. In yet another embodiment, the distillate produced could also be cracked into lower molecular weight hydrocarbons than the distillate by hydrocracking.

A process was developed to produce green diesel from natural oils and fats. The process involves deoxygenating renewable feedstocks in a hydroprocessing process with carbon chain lengths in the diesel range to produce n-paraffins with both the same number of carbons as the fatty acid chain or one carbon less if the oxygen was removed by decarboxylation. The carbon lengths in such renewable feedstocks are such that after hydroprocessing the flash point and distillations specifications such as, but not limited to, ASTM D-86 T90% point or ASTM D-86 T95% point, are substantially in conformance with diesel specifications. In an optional second stage of a hydroprocessing process, the n-paraffins are isomerized to improve the cold properties of the resulting diesel.

Crude tall oil contains a mixture comprising FFAs, rosin acids, and cyclic hydrocarbons, in addition to contaminants such as alkali and alkaline earth metals, phospholipids, ash, pentane (C5) and heptane (C7) insolubles, and pitch. Ash is the components detected using ASTM method D482 or equivalent. Pentane insolubles are the components detected by ASTM D893 or equivalent. Heptane insolubles are the components which are detected in concentrations of 0.01 mass percent or greater using ASTM method D6560 or equivalent. The presence and concentration of alkali metals, alkaline earth metals and phosphorous from phospholipids can be detected and measured using analytical methods employing induced coupled plasma. These contaminants can lead to rapid catalyst poisoning, catalyst plugging, and coking when processed in a hydroprocessing unit.

In order to avoid these problems, the crude tall oil is subjected to a distillation process that substantially removes the impurities. The process produces a combined pitch bottoms stream and a distillate stream comprising FFAs and rosin acids from two distillation columns. The distillate is relatively free of the contaminants listed above. The distillate stream is amenable to further downstream hydroprocessing.

The heaviest portion of the crude tall oil is commonly called "pitch". The heaviest portion of the crude tall oil is considered to be heavy neutrals such as multi-ring naphthenes, esters and sterols with boiling points up to 630° C. Neutral compounds that fail to form soaps when blended with alkali metal hydroxides such as lye are unsaponifiable. The exact composition of tall oil pitch can vary based the biological source such as tall oil pitch obtained from various species of trees. Holmbom and Era analyzed tall oil pitches using high resolution mass spectrometry with results reported in Journal of the American Oil Chemists' Society, Volume 55(3). Tall oil pitch comprises high molecular weight components of free acids, esterified free acids, and unsaponifiable neutral compounds. The unsaponifiable neutral compounds further comprise alcohols, sterols and dehydrated sterols. Pitch can be further defined as the portion of the tall oil after processing in this invention that contains the contaminants rejected from the distillate leading to the favorable distillate properties that are amenable to further processing of the distillate in a hydroprocessing unit.

The crude tall oil may be subjected to an optional dewatering step, such as a vacuum drying system, before introduction into the two distillation columns.

The crude tall oil is preheated and "depitched" by stripping under deep vacuum. The preheated crude tall oil is flashed in the flash zone of a stripping column under vacuum. The pressure in the flash zone is typically less than 6.7 kPa absolute (50 mm mercury absolute) or less than 3.3 kPa absolute (25 mm mercury absolute). The resulting liquid from the flash zone is stripped in a trayed or packed section below the flash zone. In one embodiment, a packed section can be used because the packed section pressure drop in this section is typically lower than the pressure drop from a trayed section.

The stripping medium for the stripping column can be a condensable or non-condensable medium. A condensable medium is preferred. One example of a condensable medium is steam, although other condensable media could be used, if desired. Steam is desirable because it has relatively low molecular weight, is commonly available, and can be pre-condensed in the second column (re-run column) before the ejectors. A condensable medium decreases the motive steam requirements for the ejectors when a pre-condenser is employed before the first stage of ejectors in the overhead system of the re-run column. Non-condensable media such as, but not limited to, inert gases like natural gas, fuel gas, hydrogen and others, can be used in the stripping column. Non-condensable gas will lead to higher ejector loadings and will require more motive steam.

In one embodiment, the steam stripping rate is typically greater than about 14 kg/m$^3$ (5 lb/bbl) of feed, and can be greater than about 28 kg/m$^3$ (10 lb/bbl) of feed or more. In another embodiment, the steam stripping rate can be greater than about 140 kg/m$^3$ (50 lb/bbl). The bottoms of the stripper column comprises the heavier portion of the pitch.

The steam and vapors from the flash zone are sent to a second vacuum distillation column, also called a re-run column. The re-run column has a stripping section and a rectification section that both may contain packing or trays. Each section nominally contains at least three theoretical stages, and typically five theoretical stages. The re-run column is reboiled to provide a reflux to distillate ratio greater than about 1.5, or greater than 2.0, or more.

The liquid from the bottom of the re-run column is a lighter portion of the pitch, and this stream can be combined with the heavier portion of pitch from the stripping column. The pitch produced from the invention can be employed as a fuel oil, feed for gasification, an additive for cement, adhesive binder, asphalt and other uses.

The overhead from the re-run column (the distillate) comprises FFAs, lighter rosin acids, and "heads." Tall oil heads are the lighter fraction of the crude tall oil and typically comprises about 10% of the crude tall oil. The composition of tall oil heads is discussed in a US EPA report entitled "High Production Volume Chemical Challenge Program for Tall Oil Fatty Acids and Related Substances" (August 2004) by The Pines Chemical Association. Tall oil heads are described as the low boiling fraction obtained by the distillation of tall oil. Tall oil heads contain lighter fatty acids such as palmitic, stearic, oleic and linoleic, as well as neutral materials. The neutral components are approximately ten percent of the tall oil heads and contain various terpenic hydrocarbons, alcohols, aldehydes, phenolics, lignin-derived materials, and other neutral materials.

The distillate typically contains less than about 5 ppm alkali metals and less than about 5 ppm phosphorus. The distillate also contains less than about 50% of the C5 and C7 insolubles and ash that are contained in the crude tall oil.

As illustrated in the FIGURE, crude tall oil flows from a storage tank 10 that is heated to maintain a temperature of approximately 50° C. The crude tall oil contains up to about 1 wt % water that is removed, for example, in a vacuum dryer system 15. The crude tall oil is heated to nominally 200° C. using a heat transfer medium, such as, but not limited to, Dowtherm A. Typically, the target moisture content is less than about 150 ppm water.

The dried crude tall oil is pumped from the vacuum dryer 15 bottom through a heat exchanger 20 to the stripping column 25. The heat exchanger 20 uses a heat transfer medium, Dowtherm A, for example, to preheat the dried crude tall oil. The stripping column feed pump 17 discharge pressure is set to prevent the crude tall oil from vaporizing. The crude tall oil vaporizes after passing through a valve 22 which controls the flow rate from the reservoir in the vacuum dryer bottom.

The vaporized crude tall oil is disengaged in the flash zone 30 of the stripping column 25 using a feed distributor. The height and diameter of the flash zone 30 are set to disengage and settle the droplets of heavy pitch before the vapor leaves the stripping column 25 in overhead vapor stream 35. The stripping column 25 is under deep vacuum. There are trays or packing in the stripping section 40 of the stripping column 25. Superheated steam (or other stripping medium) 45 can be used to strip the heavy pitch. The superheated steam can be of any pressure such that the steam's flowrate can controlled through a valve (not shown). The heavy pitch bottoms stream 50 flows out of the stripping column 25.

The overhead vapor stream 35 contains FFAs, rosin acids, heads, and light pitch vapors.

The overhead vapor stream 35 from the stripping column is in fluid communication with the re-run column 55. The re-run column 55 fractionates the distillate 60 from the light pitch bottoms stream 65. The overhead vapor stream 35 from the stripping column 25 enters the re-run column 55 between a rectification section 70 and a stripping section 75. In one embodiment, both sections are packed to reduce the overall pressure drop. However, in another embodiment, one or both sections of the re-run column could contain trays. In yet another embodiment, one or both sections could contain random or structured packing. The re-run column 55 is reboiled using a heat transfer medium, such as, but not limited to, Dowtherm A, to provide the heat to the reboiler 80. The reflux to distillate ratio is optimized in a way that minimizes the required heat input to the reboiler 80, but is adequate to prevent any large distillation tail or allowance of substantial contaminants in the overhead distillate. In order to prevent large ejector steam rates, the overhead distillate and reflux are pre-condensed using an air cooler or water cooler. The distillate 60 comprises primarily FFAs, rosin acids, and heads. The distillate 60 can be sent to one or more hydroprocessing reaction zones 85 for processing into biofuels.

In one embodiment, the use of a common heat transfer medium, such as Dowtherm A, for example, is employed for the preheating of the crude tall oil into the stripping column and reboiling the re-run column. This embodiment enables the use of a common or single source heat input for the process. For example, the Dowtherm A can be circulated through one or more heat exchangers, such as fired heaters, shell-and-tube exchangers, and/or a plate heat exchangers. The enthalpy requirements for the process are transferred into the common heat transfer medium and circulated as required for the preheating of the crude tall oil and reboiling the re-run column.

The heavy pitch bottoms stream 50 from the stripping column 25 can be combined with the light pitch bottoms stream 65 from the re-run column 55. About half of the total pitch is produced in the stripping column 25, and the remainder is produced in the re-run column 55.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A method for separating crude tall oil comprising:
   introducing crude tall oil into a flash zone of a stripping column to separate the crude tall oil into a liquid and a vapor, the stripping column being under vacuum;
   stripping the liquid in a stripping zone of the stripping column below the flash zone forming a heavy pitch bottoms stream and an overhead vapor stream, the overhead vapor stream comprising free fatty acids, rosin acids, heads, and light pitch;
   introducing the overhead vapor stream from the stripping column into a second column between a stripping zone and a rectification zone, the second column under vacuum, to separate the overhead vapor stream from the stripping column into a light pitch bottoms stream and a distillate stream, the distillate stream consisting essentially of the free fatty acids, rosin acids, and heads.

2. The method of claim 1 further comprising preheating the crude tall oil before introducing the crude tall oil into the flash zone of the stripping column.

3. The method of claim 1 further comprising combining the heavy and light pitch bottoms streams.

4. The method of claim 1 wherein the second column includes a reboiler.

5. The method of claim 4 wherein the reboiler provides a reflux to distillate ratio greater than about 1.5.

6. The method of claim 1 further comprising introducing the distillate stream into a hydroprocessing reaction zone.

7. The method of claim 1 wherein the distillate stream contains less than about 5 ppm alkali metals, and less than about 5 ppm phosphorus.

8. The method of claim 7 wherein the distillate stream contains less than 50% of $C_5$ and $C_7$ insolubles and ash contained in the crude tall oil.

9. The method of claim 1 wherein the second column has at least 3 theoretical stages in the stripping zone and at least 3 theoretical stages in the rectification zone.

10. The method of claim 1 wherein there is no reflux and no reboiler in the stripping column.

11. The method of claim 1 wherein at least a portion of the distillate from the second column is in fluid communication with the second column to provide reflux and a hydroprocessing reaction zone.

12. The method of claim 1 further comprising dewatering the crude tall oil before introducing the crude tall oil into the flash zone of the stripping column.

13. A method for separating crude tall oil comprising:
   introducing crude tall oil into a flash zone of a stripping column to separate the crude tall oil into a liquid and a vapor, the stripping column being under vacuum, the stripping column having no reflux and no reboiler;
   stripping the liquid in a stripping zone of the stripping column below the flash zone forming a heavy pitch bottoms stream and an overhead vapor stream, the overhead vapor stream comprising free fatty acids, rosin acids, heads, and light pitch;
   introducing the overhead vapor stream from the stripping column into a second column between a stripping zone and a rectification zone, the second column under vacuum, to separate the overhead vapor stream from the stripping column into a light pitch bottoms and a distillate stream, the distillate stream consisting essentially of the free fatty acids, rosin acids, and heads.

14. The method of claim 13 further comprising preheating the crude tall oil before introducing the crude tall oil into the flash zone of the stripping column.

15. The method of claim 13 further comprising combining the heavy and light pitch bottoms streams.

16. The method of claim 13 wherein the second column includes a reboiler and wherein the reboiler provides a reflux to distillate ratio greater than about 1.5.

17. The method of claim 13 wherein the distillate stream contains less than about 5 ppm alkali metals, less than about 5 ppm phosphorus, and less than 50% of $C_5$ and $C_7$ insolubles, and ash contained in the crude tall oil.

18. The method of claim 13 wherein the second column has at least 3 theoretical stages in the stripping zone and at least 3 theoretical stages in the rectification zone.

19. The method of claim 13 further comprising dewatering the crude tall oil before introducing the crude tall oil into the flash zone of the stripping column.

20. The method of claim 13 further comprising introducing the distillate stream into a hydroprocessing reaction zone.

* * * * *